United States Patent
Kang et al.

(10) Patent No.: US 10,565,328 B2
(45) Date of Patent: Feb. 18, 2020

(54) METHOD AND APPARATUS FOR MODELING BASED ON PARTICLES FOR EFFICIENT CONSTRAINTS PROCESSING

(71) Applicant: Samsung Electronics Co., Ltd., Suwon-si (KR)

(72) Inventors: Nahyup Kang, Seoul (KR); Jiyeon Kim, Hwaseong-si (KR); Donghoon Sagong, Suwon-si (KR); Hyong Euk Lee, Suwon-si (KR); Hwiryong Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 15/187,135

(22) Filed: Jun. 20, 2016

(65) Prior Publication Data

US 2017/0024498 A1 Jan. 26, 2017

(30) Foreign Application Priority Data

Jul. 20, 2015 (KR) ........................ 10-2015-0102235

(51) Int. Cl.
*G06F 17/50* (2006.01)
*G06F 7/02* (2006.01)
(Continued)

(52) U.S. Cl.
CPC ............ *G06F 17/5009* (2013.01); *G06F 7/02* (2013.01); *G06T 17/00* (2013.01); *G06T 19/20* (2013.01);
(Continued)

(58) Field of Classification Search
CPC ............ G06T 17/00; G06T 2219/2021; G06T 2210/56; G06T 19/20; G06F 17/5009; G06F 7/02
See application file for complete search history.

(56) References Cited

U.S. PATENT DOCUMENTS 7,616,204 B2  11/2009  Muller et al.
7,889,949 B2   2/2011  Cohen et al.
(Continued)

FOREIGN PATENT DOCUMENTS

KR     10-1470488 B1    12/2014

OTHER PUBLICATIONS

O'Brien et al. "Automatic Simplification of Particle System Dynamics" 14th Conference on Computer Animation (2001) [retrieved on Jun. 1, 2018]. Retrieved from <https://ieeexplore.ieee.org/abstract/document/982395/>.*

(Continued)

*Primary Examiner* — Rehana Perveen
*Assistant Examiner* — Alfred H B Wechselberger
(74) *Attorney, Agent, or Firm* — NSIP Law (57) ABSTRACT

A modeling method based on particles, the method including generating coarse particles by down-sampling target particles corresponding to at least a portion of a target object, calculating a correcting value enabling the coarse particles to satisfy constraints of the target object based on physical attributes of the target particles, applying the correcting value to the target particles, and redefining the target particles in response to the target particles to which the correcting value is applied satisfying the constraints.

16 Claims, 8 Drawing Sheets

(51) Int. Cl.
G06T 17/00 (2006.01)
G06T 19/20 (2011.01)
(52) U.S. Cl.
CPC .. *G06T 2210/56* (2013.01); *G06T 2219/2021* (2013.01)

(56) References Cited

U.S. PATENT DOCUMENTS

| | | | |
|---|---|---|---|
| 8,442,306 | B2 | 5/2013 | Garaas et al. |
| 8,588,544 | B2 | 11/2013 | Lei et al. |
| 8,682,094 | B2 | 3/2014 | Au et al. |
| 8,700,366 | B1 | 4/2014 | Zhang et al. |
| 8,823,745 | B2 | 9/2014 | Francois et al. |
| 8,922,553 | B1* | 12/2014 | Tena ................... G06T 17/00 345/419 |
| 8,922,654 | B2 | 12/2014 | Ellis |
| 8,996,337 | B1* | 3/2015 | Muller-Fischer ....... G06T 13/20 703/2 |
| 2009/0060273 | A1 | 3/2009 | Stephan et al. |
| 2015/0036926 | A1 | 2/2015 | Choi et al. |
| 2015/0227651 | A1* | 8/2015 | Gowaikar ........... G06F 17/5009 703/2 |
| 2016/0210384 | A1* | 7/2016 | Stomakhin .......... G06F 17/5009 |
| 2016/0292902 | A1* | 10/2016 | Milne ................... G06T 9/40 |

OTHER PUBLICATIONS

Guibas et al. "Collision Detection for Deforming Necklaces" SoCG 2002, Barcelona, Spain; doi: 10.1145/513400.513405 [retrieved on Jun. 7, 2018]. Retrieved from <https://dl.acm.org/citation.cfm?id=513405>.*

Takahashi et al. "Accelerated Viscous Fluid Simulation Using Position-Based Constraints" 2013 13th International Conference on Computer-Aided Design and Computer Graphics [retrieved on Jun. 1, 2018]. Retrieved from <https://ieeexplore.ieee.org/document/6815004/>.*

Atencio et al. "A Collision Detection and Response Scheme for Simplified Physically Based Animation" XVII Brazilian Symposium on Computer Graphics and Image Processing (2005) [retrieved on Jun. 1, 2018]. Retrieved from <https://ieeexplore.ieee.org/document/1599116/>.*

Debunne et al. "Adaptive Simulation of Soft Bodies in Real-Time" Proceedings Computer Animation 2000 (May 2000) doi:10.1109/CA.2000.889022 [retrieved on Jun. 1, 2018]. Retrieved from <https://ieeexplore.ieee.org/document/889022/>.*

Jakobsen, T. "Advanced Character Physics" (2003) [retrieved on Jun. 6, 2018]. Retrieved from <http://www.cs.cmu.edu/afs/cs/academic/class/15462-s13/www/lec_slides/Jakobsen.pdf>.*

Lotan et al. "Efficient Maintenance and Self-Collision Testing for Kinematic Chains" SCG '02 Proceedings of the eighteenth annual symposium on Computational geometry, pp. 43-52 (Jun. 2002) [retrieved on Jun. 5, 2018]. Retrieved from <https://dl.acm.org/citation.cfm?id=513406>.*

Lv et al. "A Fast Self-collision Detection Method for Cloth Animation Based on constrained Particle-based Model" Second Workshop on Digital Media and Its Applications in Museum and Heritage [retrieved on Feb. 2, 2019]. Retrieved from <https://ieeexplore.ieee.org/abstract/document/4414542/> (Year: 2008).*

Bender at al. "A Survey on Position-Based Simulation Methods in Computer Graphics" Computer Graphics Forum, vol. 33, Iss. 6; doi: https://doi.org/10.1111/cgf.12346 [retrieved on Feb. 2, 2019]. Retrieved from <https://onlinelibrary.wiley.com/doi/full/10.1111/cgf.12346> (Year: 2014).*

Faure et al. "Eulerian Contact for Versatile Collision Processing" [Research Report] RR-6203, INRIA, [retrieved on Feb. 2, 2019]. Retrieved from <https://hal.archives-ouvertes.fr/inria-00149706/> (Year: 2007).*

Muller et al. "Meshless Deformations Based on Shape Matching" SIGGRAPH 2005 Papers, pp. 471-478 [retrieved on Dec. 30, 2018]. Retrieved from <https://dl.acm.org/citation.cfm?id=1073216> (Year: 2005).*

James et al. "Multiresolution Green's Function Methods for Interactive Simulation of Large-Scale Elastostatic Objects" ACM Transactions on Graphics, vol. 22, No. 1, pp. 47-82 [retrieved on Sep. 24, 2019]. Retrieved from <https://dl.acm.org/citation.cfm?id=588278> (Year: 2003).*

Adams et al. "Meshless Approximation Methods and Applications in Physics Based Modeling and Animation" EUROGRAPHICS 2009, Tutorial [retrieved on Feb. 25, 2019]. Retrieved from <https://pdfs.semanticscholar.org/6826/21119ea2f45065f30abb0c30ce8739e7ed0e.pdf> (Year: 2009).*

Ihmsen et al. "SPH Fluids in Computer Graphics" EUROGRAPHICS 2014, STAR Report [retrieved on Aug. 30, 2019]. Retreived from <https://diglib.eg.org/handle/10.2312/egst.20141034.021-042>. (Year: 2014).*

Cohen et al. "Simplification Envelope" Proceedings ACM SIGGRAPH, pp. 119-128 [retrieved on Sep. 23, 2019]. Retrieved from <http://gamma.cs.unc.edu/ENVELOPES/ENVELOPES.pdf> (Year: 1996).*

Adams et al. "Adaptively Sampled Particle Fluids" ACM Transactions on Graphics, vol. 26, No. 3, Article 48, pp. 48-1-48-7 [retrieved on Dec. 2, 2017]. Retrieved from <http://lgg.epfl.ch/publications/2007/adams_2007_ASP.pdf> (Year: 2007).*

Muller et al. "Particle-Based Fluid Simulation for Interactive Applications" Eurographics/SIGGRAPH Symposium on Computer Animation, pp. 154-160 [retrieved on Jun. 5, 2018]. Retrieved from <http://matthias-mueller-fischer.ch/publications/sca03.pdf> (Year: 2003).*

Debunne et al. "Interactive multiresolution animation of deformable models" Computer Animation and Simulation 1999, Eurographics Workshop, pp. 133-144 [retrieved on Dec. 31, 2018]. Retrieved from <https://hal.inria.fr/inria-00510072/document> (Year: 1999).*

Li et al. "Meshfree Particle Methods" Chapter 7, pp. 373-376 [retrieved on Dec. 1, 2017]. Retrieved from <https://rd.springer.com/book/10.1007/978-3-540-71471-2> (Year: 2007).*

Debunne et al. "Adaptive Simulation of Soft Bodies in Real-Time" Proceedings Computer Animation 2000; DOI: 10.1109/CA.2000.889022 [retrieved on Jun. 1, 2018]. Retrieved from <https://ieeexplore.ieee.org/document/889022> (Year: 2000).*

* cited by examiner

METHOD AND APPARATUS FOR MODELING BASED ON PARTICLES FOR EFFICIENT CONSTRAINTS PROCESSING

CROSS-REFERENCE TO RELATED APPLICATION(S)

This application claims the benefit under 35 USC 119(a) of Korean Patent Application No. 10-2015-0102235 filed on Jul. 20, 2015, in the Korean Intellectual Property Office, the entire disclosure of which is incorporated herein by reference for all purposes.

BACKGROUND

1. Field

The following description relates to a method and an apparatus for modeling based on particles for efficient constraints processing.

2. Description of Related Art

In modeling a fluid or a deformable body, a response to an external force is reflected in real time and a natural movement for eyes is represented concurrently. Therefore, processing of various constraints to satisfy physical attributes and boundary conditions of a fluid or a deformable body may be performed. When particles included in the fluid or the deformable body perform the processing for satisfying the constraints, a number of iterations for the constraints to be satisfied may nonlinearly increase in response to an increase in a number of particles.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a modeling method based on particles includes generating coarse particles by down-sampling target particles corresponding to at least a portion of a target object; calculating a correcting value enabling the coarse particles to satisfy constraints of the target object based on physical attributes of the target particles; applying the correcting value to the target particles; and redefining the target particles in response to the target particles to which the correcting value is applied satisfying the constraints.

The generating of the coarse particles may include generating the coarse particles by down-sampling the target particles corresponding to the at least a portion of the target object based on either one or both of a geometric boundary and the constraints of the target object.

The generating of the coarse particles may further include generating the coarse particles in different sizes by adaptively down-sampling the target particles corresponding to the at least a portion of the target object.

The generating of the coarse particles may include generating the coarse particles by down-sampling the target particles corresponding to the at least a portion of the target object based on an error threshold of a geometric boundary and the constraints of the target object.

The generating of the coarse particles may include setting at least a portion of the target object in which a violation of the constraints occurs based on either one or both of a geometric boundary and the constraints of the target object to be a portion in which the coarse particles are to be generated; and generating the coarse particles by down-sampling the target particles corresponding to the at least a portion in which the violation of the constraints occurs.

The calculating of the correcting value may include reflecting the physical attributes of the target particles to the coarse particles; and calculating a position correcting value enabling the coarse particles to which the physical attributes are reflected to satisfy the constraints.

The redefining of the target particles may include applying the correcting value to the target particles; determining whether the target particles to which the correcting value is applied satisfy the constraints; and redefining the target particles to be the target particles to which the correcting value is applied in response to a result of the determining being that the target particles to which the correcting value is applied satisfy the constraints.

The method may further include generating the coarse particles based on information on the target particles to which the correcting value is applied in response to a result of the determining being that the target particles to which the correcting value is applied do not satisfy the constraints.

The applying of the correcting value to the target particles may include moving positions of the target particles by applying the correcting value to the target particles.

The method may further include obtaining information on target particles corresponding to the target object.

The physical attributes of the target particles may include any one or any combination of any two or more of radiuses, masses, densities, velocities, positions, and strengths of the target particles.

The target object may include either one or both of a fluid and a deformable body.

In another general aspect, a non-transitory computer-readable storage medium stores instructions for causing a processor to perform the method described above.

In another general aspect, a modeling apparatus based on particles includes a memory configured to store information on target particles; and a processor configured to generate coarse particles by down-sampling the target particles corresponding to at least a portion of a target object, calculate a correcting value enabling the coarse particles to satisfy constraints of the target object based on physical attributes of the target particles, applying the correcting value to the target particles, and redefining the target particles in response to the target particles to which the correcting value is applied satisfying the constraints.

The processor may be further configured to generate the coarse particles in different sizes by adaptively down-sampling the target particles corresponding to the at least a portion of the target object based on either one or both of a geometric boundary and the constraints of the target object.

The processor may be further configured to set at least a portion of the target object in which a violation of the constraints occurs based on an error threshold of a geometric boundary and the constraints of the target object to be a portion in which the coarse particles are to be generated, and generate the coarse particles by down-sampling the target particles corresponding to the at least a portion in which the violation of the constraints occurs.

The processor may be further configured to reflect the physical attributes of the target particles to the coarse particles, and calculate a position correcting value enabling the coarse particles to which the physical attributes are reflected to satisfy the constraints.

The processor may be further configured to move positions of the target particles by applying the correcting value, and redefine the target particles to be the target particles to which the correcting value is applied in response to the moved target particles satisfying the constraints.

The processor may be further configured to generate the coarse particles based on information on the target particles to which the correcting value is applied in response to the target particles to which the correcting value is applied not satisfying the constraints.

The apparatus may further include a receiver configured to receive information on target particles corresponding to the target object.

Other features and aspects will be apparent from the following detailed description, the drawings, and the claims.

BRIEF DESCRIPTION OF THE DRAWINGS

Throughout the drawings and the detailed description, the same drawing reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular examples only, and is not intended to limit the disclosure. As used herein, the singular forms "a," "an," and "the" are intended to include the plural forms as well, unless the context clearly indicates otherwise. As used herein, the terms "include, "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Figure 1:
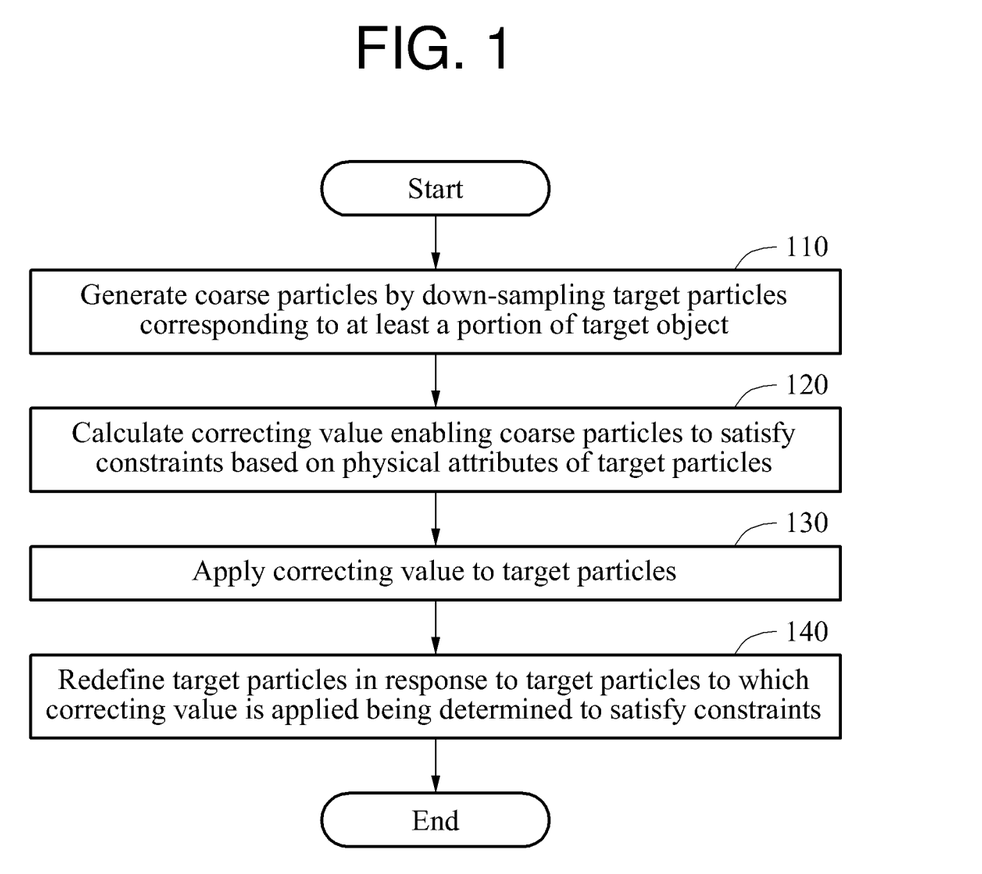
FIG. 1 is a flowchart illustrating an example of a modeling method based on particles.

FIG. 1 is a flowchart illustrating an example of a modeling method based on particles.

Referring to FIG. 1, in operation 110, a modeling apparatus based on particles, hereinafter, referred to as a "modeling apparatus", generates coarse particles by down-sampling target particles corresponding to at least a portion of a target object. The target object may be a fluid, a deformable body, or a combination thereof. The deformable body may be any kind of rigid or soft body. The target particles are particles configuring a target object when the target object is modeled based on particles.

The modeling apparatus may generate the coarse particles based on, for example, a weighted sum, a representative value, or an average value of attribute values of the target particles. Alternatively, the modeling apparatus may generate the coarse particles by dividing a space in which the target particles are positioned into a plurality of cells based on a grid, and generate the coarse particles by combining target particles in each cell of the grid.

Examples of a method of generating the coarse particles by down-sampling the target particles will be described with reference to FIGS. 5A to 5C.

The modeling apparatus may specify a down-sampling portion as a predetermined portion of the target object based on either one or both of a geometric boundary and constraints of the target object. The modeling apparatus may generate the coarse particles in different sizes for each portion by adaptively down-sampling the target particles.

An example of a method of generating the coarse particles by adaptively down-sampling the target particles will be described with reference to FIG. 6.

In operation 120, the modeling apparatus calculates a correcting value enabling the coarse particles to satisfy the constraints of the target object based on physical attributes of the target particles. For example, the physical attributes of the target particles include any one or any combination of any two or more of radiuses, masses, densities, velocities, positions, strengths, and viscosities of the target particles. The physical attributes of the target particles may be calculated in advance by the modeling apparatus and stored in a memory.

For example, the modeling apparatus may calculate a density of each particle according to Equation 1 below.

$$\rho_i = \sum_{j \in N} m_j W(x_i - x_j, h) \tag{1}$$

In Equation 1, $\rho_i$ denotes a density of a particle i, $m_j$ denotes a mass of a particle j neighboring the particle i, W denotes a kernel function, for example, a weight function, $x_i-x_j$ denotes a distance between the particle i and the particle j, and N denotes a set of neighboring particles j within a radius h of the particle i.

The modeling apparatus may calculate a position correcting value reflecting a position at which the coarse particles satisfy the constraints by reflecting the physical attributes of the target particles to the coarse particles.

In operation 130, the modeling apparatus applies the calculated correcting value to the target particles.

In operation 140, the modeling apparatus redefines the target particles in response to the target particles to which the correcting value is applied being determined to satisfy the constraints.

Figure 2:
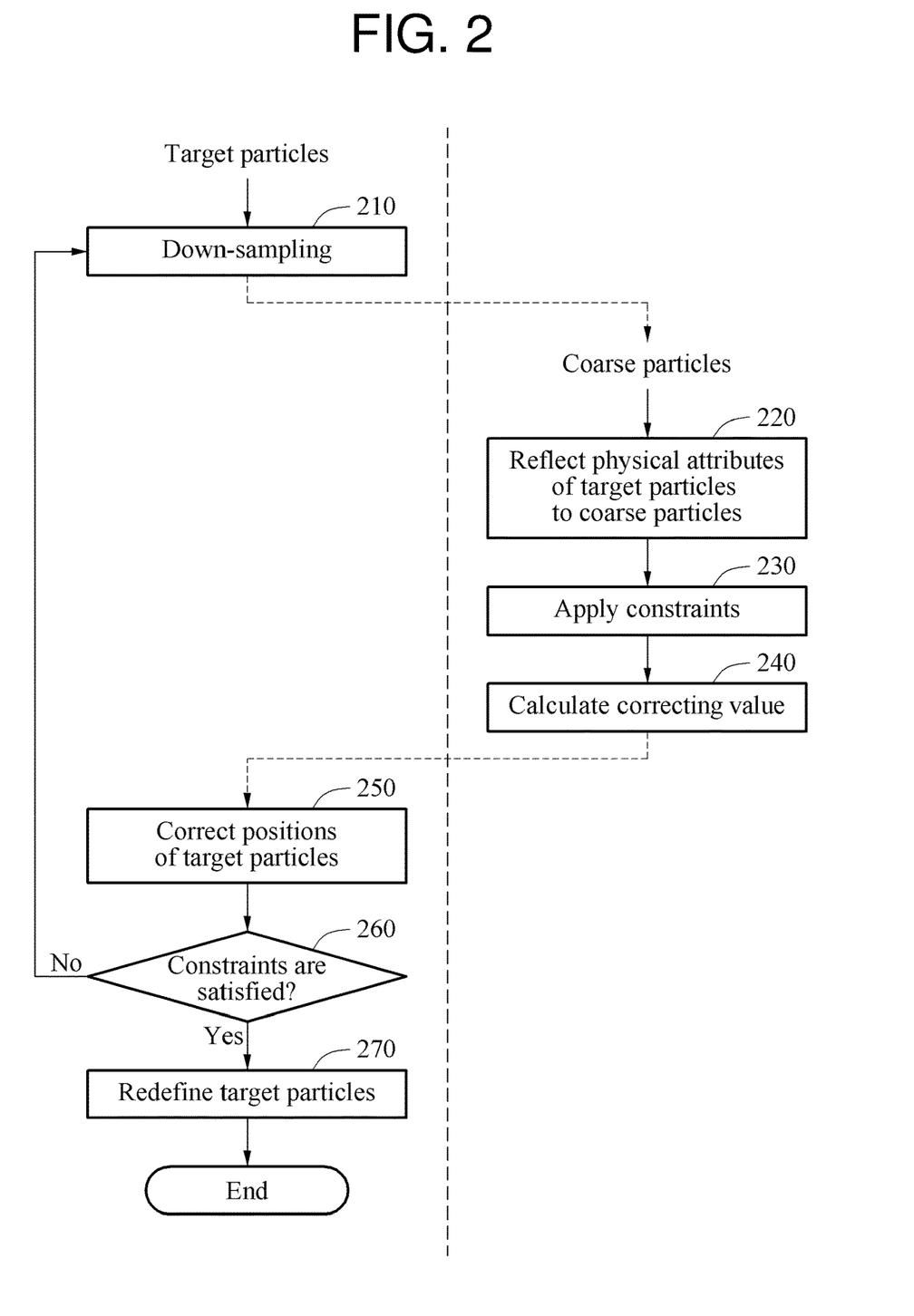
FIG. 2 is a flowchart illustrating an example of a process in which a modeling method based on particles is performed.

FIG. 2 is a flowchart illustrating an example of a process in which a modeling method based on particles is performed.

FIG. 2 illustrates that performing an operation on target particles during a modeling based on particles is separated from performing an operation on down-sampled coarse particles.

In operation 210, the modeling apparatus down-samples the target particles to the coarse particles. In operation 220, the modeling apparatus reflects physical attributes of the target particles to the coarse particles. The modeling apparatus may reflect physical attribute values of the target particles to the coarse particles. In operation 230, the modeling apparatus applies constraints of a target object to the coarse particles to which the physical attributes are reflected.

In operation 240, the modeling apparatus calculates a correcting value enabling the coarse particles to which the physical attributes are reflected to satisfy the constraints. For example, the correcting value may be a position correcting value. The modeling apparatus may calculate the correcting value enabling the coarse particles to which the physical attributes are reflected to satisfy the constraints based on a method, for example, a position-based dynamics method or a smoothed-particle hydrodynamics (SPH) method.

In operation 240, the modeling apparatus tests whether the calculated correcting value satisfies actual constraints. The modeling apparatus may not perform an iterating process in which an error of the calculated correcting value is converged to a predetermined value.

In operation 250, the modeling apparatus corrects positions of the target particles by applying the correcting value calculated in operation 240 to the target particles. The modeling apparatus moves the positions of the target particles by applying the correcting value. For example, the modeling apparatus moves the positions of the target particles based on an SPH method.

In operation 260, the modeling apparatus determines whether the target particles of which the positions have been corrected or moved satisfy the constraints.

In operation 270, the modeling apparatus redefines the target particles to be the target particles to which the correcting value is applied when it is determined the constraints are satisfied in operation 260. The physical attributes of the target particles to be redefined may be determined based on, for example, physical attribute values of coarse particles at a position closest to the redefined target particles, or a method of dividing, in proportion to a distance, a weighted sum with respect to the coarse particles adjacent to the redefined target particles.

The modeling apparatus may redefine the target particles corresponding to the coarse particles based on a value, for example, a velocity value, obtained from the coarse particles to which the physical attributes are reflected in operation 220. When the velocity value obtained from the coarse particles is reflected, the modeling apparatus may represent a soft movement of the target object similar to an effect of using a low-pass filter.

The modeling apparatus repeats the down-sampling in operation 210 based on the target particles of which the positions have been corrected or moved by the correcting value when it is determined that the constraints are not satisfied in operation 260.

The modeling apparatus newly performs the down-sampling on the target particles for every iteration. However, a process of calculating a correcting value of particles in which a calculation overload occurs, that is, operations 230 and 240, may decrease a processing time by performing the down-sampling on the coarse particles. Concisely, a total amount of computation may be reduced by calculating the correcting value enabling the physical attributes to satisfy the constraints based on coarse particles corresponding to at least a portion in which a violation of the constraints occurs.

An interpolation error may be minimized by determining whether the constraints, for example, accuracy, are satisfied.

Figure 3:
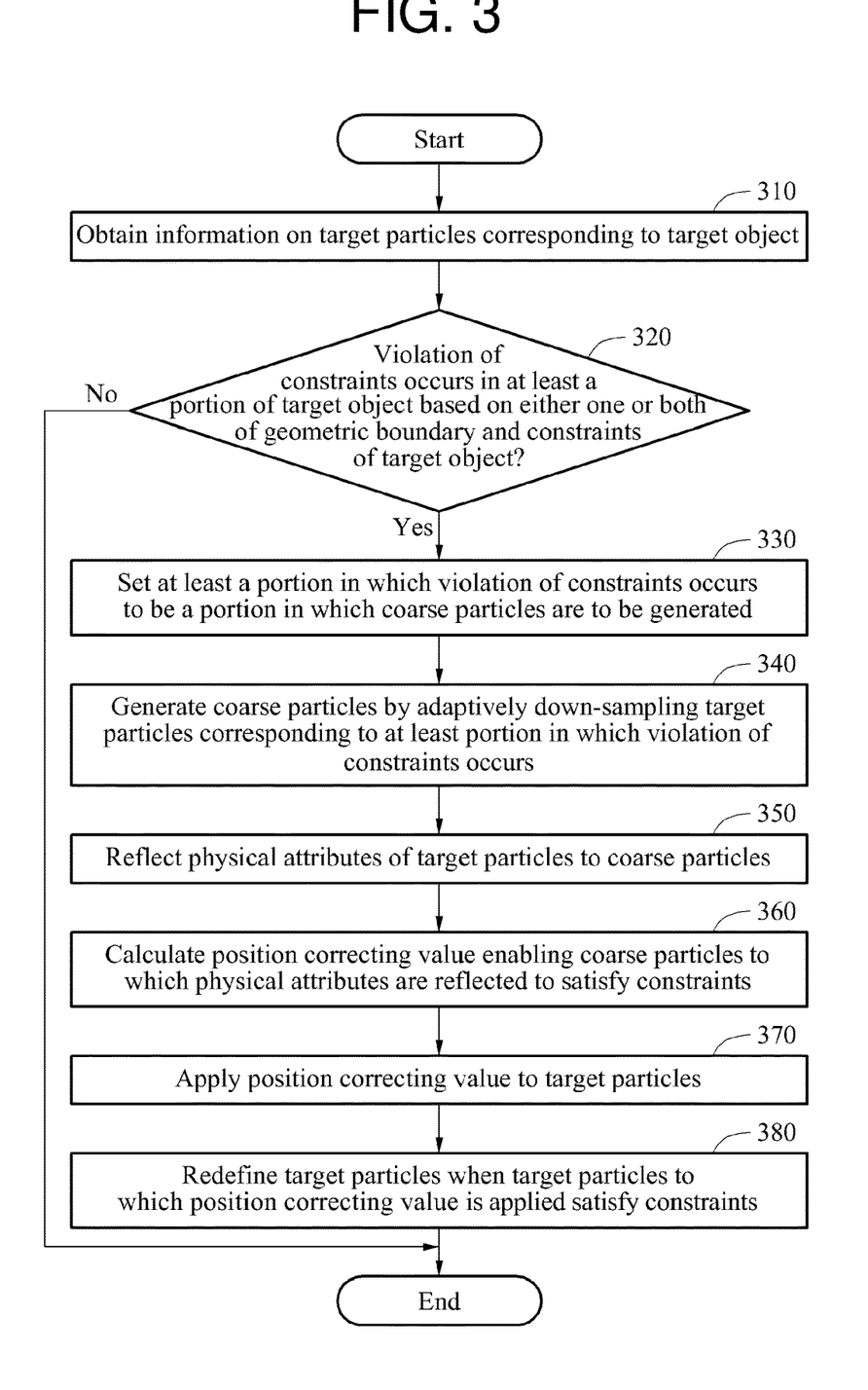
FIG. 3 is a flowchart illustrating another example of a modeling method based on particles.

FIG. 3 is a flowchart illustrating another example of a modeling method based on particles.

Referring to FIG. 3, in operation 310, the modeling apparatus obtains information on target particles corresponding to a target object. In operation 320, the modeling apparatus determines whether a violation of constraints occurs in at least a portion of the target object based on either one or both of a geometric boundary and the constraints of the target object. Based on a result of the determining in operation 320, the modeling apparatus terminates an operation when the violation of the constraints is determined not to be occur in the at least a portion of the target object.

In operation 330, based on a result of the determining in operation 320, the modeling apparatus sets the at least a portion in which the violation of the constraints occurs to be a portion in which coarse particles are to be generated when the violation of the constraints is determined to occur in the at least a portion of the target object. In this example, "the violation of the constraints occurs" refers to a deformation, for example, a distortion or a swelling, of a target object that occurs due to an external force, for example, a collision. When the deformation occurs in the target object, the modeling apparatus enables the target particles corresponding to the at least a portion in which the violation of the constraints occurs to satisfy the constraints, thereby modeling a restitution force of the target object to return the target object to its original form.

In operation 340, the modeling apparatus generates the coarse particles by adaptively down-sampling the target particles corresponding to the at least one portion in which the violation of the constraints occurs. For example, the modeling apparatus may adaptively down-sample the target particles based on a sampling rate input from a user or a predetermined sampling rate. In this example, the modeling apparatus may generate the coarse particles so that radiuses of the coarse particles are directly proportional to the sampling rate and masses of the coarse particles are proportional to the square of the sampling rate. Also, the modeling apparatus may model the coarse particles so that densities of the coarse particles are equal to densities of the target particles at a predetermined location in the at least one portion. An example of a method of adaptively down-sampling the target particles corresponding to the at least one portion will be described with reference to FIG. 6.

In operation 350, the modeling apparatus reflects the physical attributes of the target particles to the coarse particles. In one example, the modeling apparatus generates the coarse particles by reflecting the physical attributes of the target particles based on the sampling rate input from the user. In this example, since the physical attributes of the target particles are already reflected to the coarse particles, operation 350 of reflecting the physical attributes of the target particles may be omitted.

In operation 360, the modeling apparatus calculates a position correcting value enabling the coarse particles to which the physical attributes are reflected to satisfy the constraints.

In operation 370, the modeling apparatus applies the position correcting value calculated in operation 360 to the target particles. The modeling apparatus moves the positions of the target particles by calculating the position correcting value of the target particles from the position correcting value calculated in operation 360. For example, for calculating the position correcting value of the target particles from the position correcting value calculated in operation 360, an SPH method may be used.

Since the physical attributes, for example, density values, may change in response to movements of the positions of the target particles based on the position correcting value of the target particles, the modeling apparatus may update the physical attributes of the target particles or resample the target particles.

In operation 380, the modeling apparatus redefines the target particles when the target particles to which the position correcting value is applied satisfy the constraints of the target object.

Figure 4:
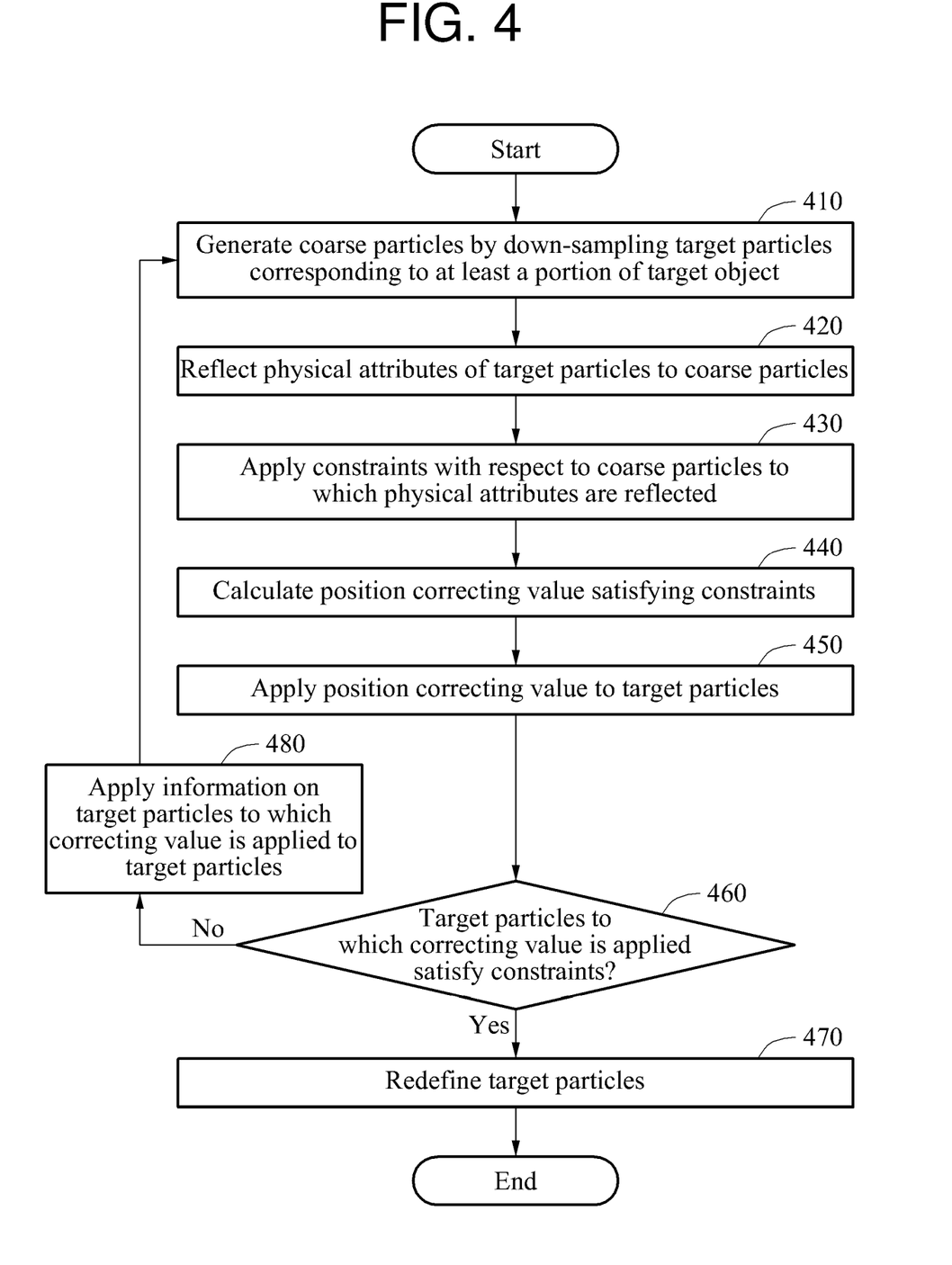
FIG. 4 is a flowchart illustrating another example of a modeling method based on particles.

FIG. 4 is a flowchart illustrating another example of a modeling method based on particles.

Referring to FIG. 4, in operation 410, the modeling apparatus generates coarse particles by down-sampling target particles corresponding to at least a portion of a target object. The modeling apparatus generates the coarse particles by down-sampling the target particles based on an error threshold of a geometric boundary and constraints of the target object.

In operation 420, the modeling apparatus reflects physical attributes of the target particles to the coarse particles.

In operation 430, the modeling apparatus applies the constraints with respect to the coarse particles to which the physical attributes are reflected. In operation 440, the modeling apparatus calculates a position correcting value enabling the coarse particles to which the physical attributes are reflected to satisfy the constraints. In operation 450, the modeling apparatus applies the position correcting value to the target particles.

In operation 460, the modeling apparatus determines whether the target particles to which the correcting value is applied satisfy the constraints. In operation 470, the modeling apparatus redefines the target particles to be the target particles to which the correcting value is applied in response to the target particles to which the correcting value is applied being determined to satisfy the constraints in operation 460.

In operation 480, in response to the target particles to which the correcting value is applied being determined not to satisfy the constraints in operation 460, the modeling apparatus applies, to the target particles, information on the target particles to which the correcting value is applied, and generates the coarse particles by down-sampling the target particles to which the information on the target particles is applied in operation 410. The information on the target particles to which the correcting value is applied may include, for example, information on positions, velocities, densities, pressures, temperatures, and any other physical attributes of target particles to which the correcting value is applied.

The modeling method based on particles may be applied to a game engine or a physical engine. For example, the modeling method based on particles may be provided in a native code and used for producing movies and broadcasting contents.

Figure 5A:
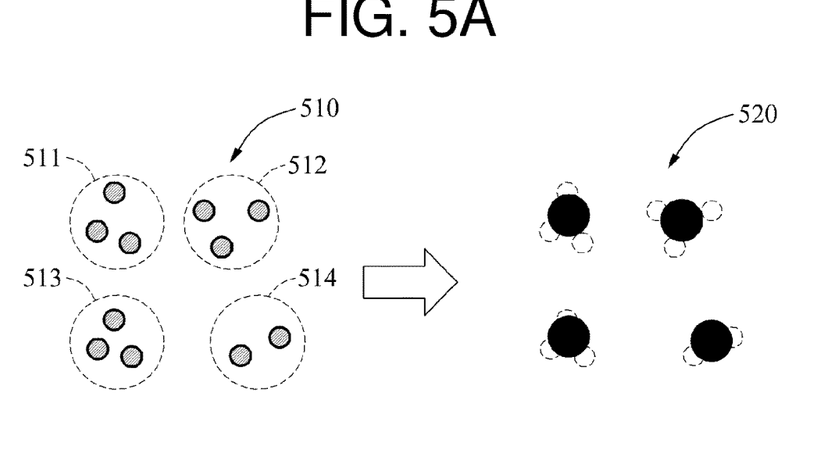
FIGS. 5A through 5C are diagrams illustrating an example of a method of generating coarse particles by down-sampling target particles.
Figure 5B:
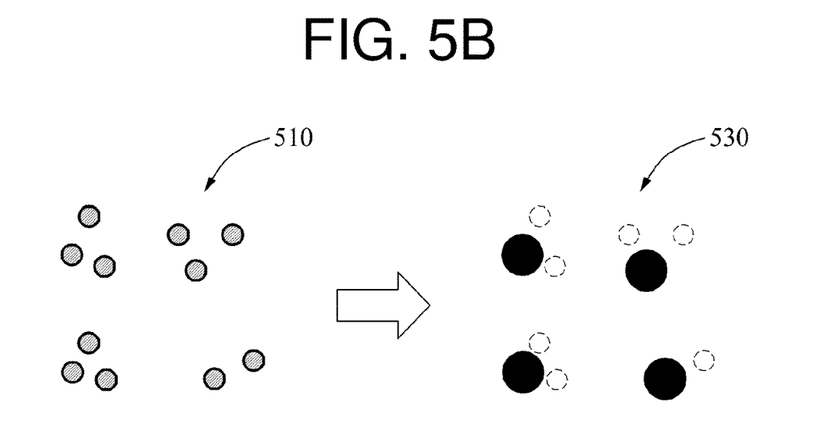
Figure 5C:
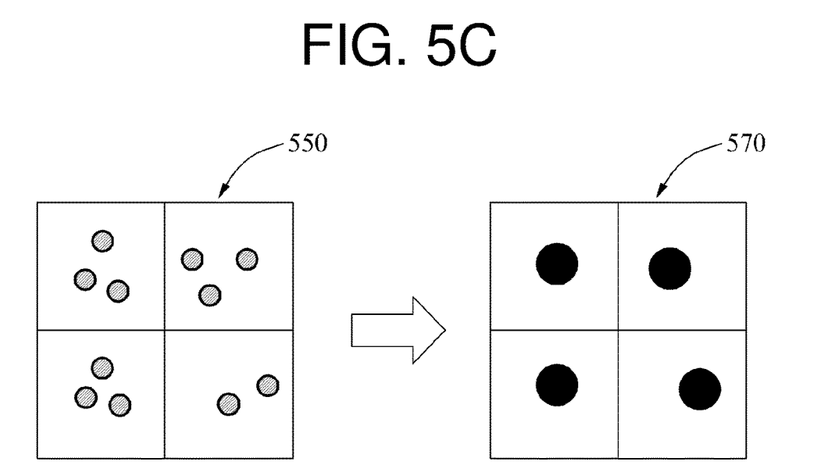

FIGS. 5A through 5C are diagrams illustrating an example of a method of generating coarse particles by down-sampling target particles.

Referring to FIGS. 5A through 5C, target particles 510 and 550 configuring a target object and coarse particles 520, 530, and 570 generated by down-sampling the target particles 510 and 550 are shown.

As used herein, "down-sampling" refers to selecting a portion in which particles exist by analyzing all of the particles configuring a target object, and replacing particles corresponding to the selected portion with a fewer number of particles having a larger size and a lower resolution.

For example, the target particles 510 and 550 configuring the target object may exist in a predetermined space, and among the target particles 510 and 550, particles closely positioned relative to each other within a predetermined distance may be present. In this example, the target particles 510 and 550 may be associated with physical attribute values of particles, for example, information on positions, velocities, densities, pressures, and temperatures needed for modeling the particles. The physical attribute values of the target particles 510 and 550 may be transferred to the coarse particles 520, 530, and 570 in a down-sampling process.

The target particles 510 and 550 are down-sampled to generate the coarse particles 520, 530, and 570, which are fewer in number than the target particles 510 and 50. The coarse particles 520, 530, and 570 are generated by combining, among the target particles 510, adjacent particles positioned within a predetermined distance of each other, or the coarse particles 520, 530, and 570 may be generated by a method of selecting a representative particle among the target particles 510.

For example, attribute values of the coarse particles 520, 530, and 570 may be obtained by a representative value, an average value, or a weighted sum of attribute values of the target particles 510. When the representative value, the average value, or the weighted sum of the attribute values of the target particles 510 are used as the attribute values of the coarse particles 520, 530, and 570, the target object may be represented as having an appearance similar to an effect of using a low-pass filter.

The modeling apparatus a number of calculations needed for particle modeling by decreasing, by down-sampling, a number of the target particles 510 corresponding to a portion in which a violation of the constraints occurs in the target object. The modeling apparatus may reduce a number of particles used for calculating a movement of the target object and maintain a number of particles used for an actual visualization, thereby maintaining a visual resolution with respect to a final output.

Hereinafter, various methods of generating coarse particles will be described.

The modeling apparatus may combine adjacent particles positioned within a predetermined distance of each other to generate coarse particles, or divide a space in which the particles are positioned into a grid, and generate coarse particles by combining particles positioned in each space, for example, a cell, of the grid.

Hereinafter, FIGS. 5A and 5B illustrate examples of a method of generating coarse particles by combining adjacent particles positioned within a predetermined distance of each other, and FIG. 5C illustrates an example of a method of generating coarse particles by combining particles positioned in each space, for example, a cell, of a grid.

An example of a method of generating the coarse particles by a weighted sum to combine adjacent particles positioned within a predetermined distance of each other will be described below.

Referring to FIG. 5A, the modeling apparatus combines target particles positioned within a predetermined distance, for example, 1 millimeter (mm), of each other among the target particles 510 positioned in a predetermined portion. For example, four coarse particles 520 are generated by combining all of the particles included in each of the sets 511, 512, 513, and 514 of the target particles positioned within 1 mm of each other among the target particles 510.

The four coarse particles 520 are generated from each of the sets 511, 512, 513, and 514 of the target particles. The physical attribute values of the coarse particles 520 may be weighted sums with respect to the physical attribute values, for example, densities and positions, of the target particles included in the sets 511, 512, 513, and 514 of the target particles. Each of the target particles 510 may have a kernel function in which an adjacent particle may exert a relatively large influence on a physical attribute value of the target particle, and a more distant particle may exert a relatively small influence on the physical attribute value of the target particle.

Referring to FIG. 5B, the modeling apparatus selects representative particles 530 among the target particles positioned within a predetermined distance, for example, 1 mm, of each other in a predetermined portion. Each of the representative particles 530 is determined for each of the sets 511, 512, 513, and 514 of the target particles as illustrated in FIG. 5A, and the representative particles 530 become coarse particles.

Referring to FIG. 5C, the modeling apparatus divides a space in which the target particles are positioned into a plurality of cells based on a grid, and generates coarse particles by combining target particles in each cell of the grid. In this example, the coarse particles may have a representative value or an average value of physical attributes of the target particles combined in each cell of the grid.

Figure 6:
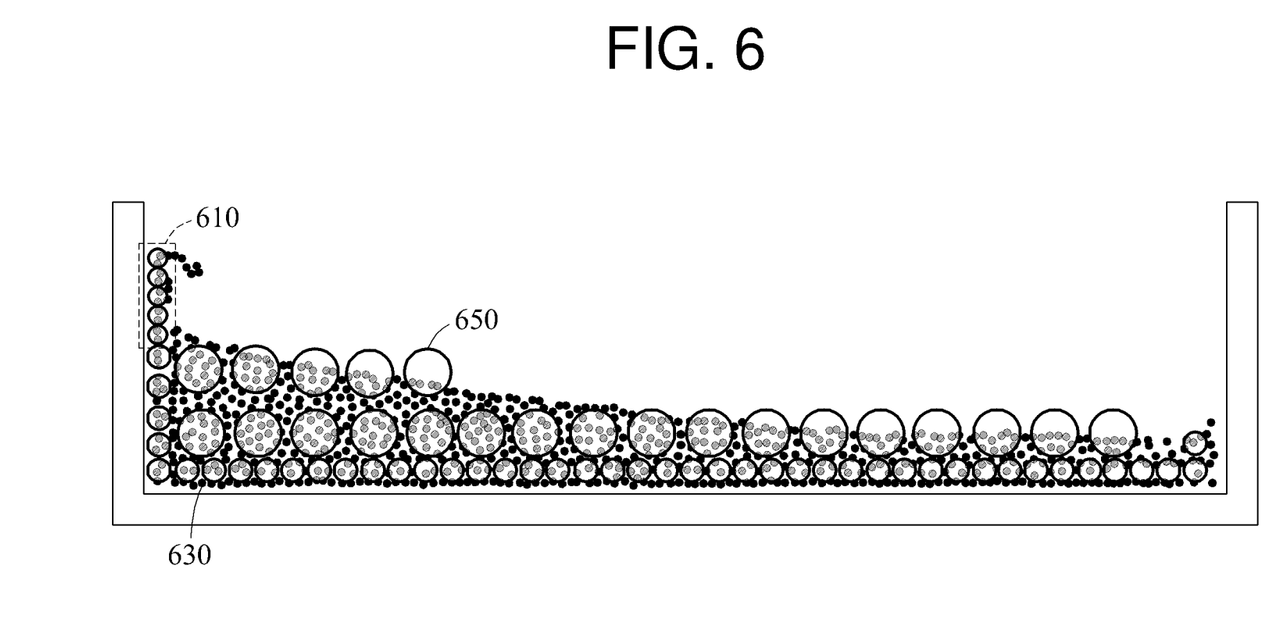
FIG. 6 is a diagram illustrating an example of a method of generating coarse particles in different sizes by adaptively down-sampling target particles.

FIG. 6 is a diagram illustrating an example of a method of generating coarse particles in different sizes by adaptively down-sampling target particles.

In a physical modeling of a target object, initially set constraints of the target object are maintained unless a boundary condition occurs to a collision with another object or a contact with a boundary, for example, a surface, of a space during modeling. For example, a free falling rubber ball is not deformed until making contact with a floor. When the rubber ball makes contact with the floor, the rubber ball begins to be deformed and a restoring force to restore the rubber ball to its original form is generated.

When a deformation by a collision is modeled, a violation of constraints occurs due to the collision when a target object makes contact with a floor. Subsequently, the target object restored to its original form by the restoring force may be modeled in a process satisfying the constraints, for example, maintaining particle distance and volume before a collision, of the target object.

A portion of the target particles in which the violation of the constraints occurs is adaptively down-sampled, rather than down-sampling an entire portion of the target object.

For example, the modeling apparatus may analyze an error for each of target particles and surroundings of boundary surfaces of the target particles corresponding to the target object, and down-sample the target particles corresponding to a portion in which a relatively large violation of the constraints occurs to coarse particles in different sizes.

Referring to FIG. 6, a result of modeling a fluid based on particles is illustrated.

For modeling an incompressible fluid, the modeling apparatus satisfies constraints enabling a density of the fluid to be preserved. In one example, the modeling apparatus selects a portion having a relatively large density error compared to surroundings of a boundary surface of the fluid, and down-samples the target particles corresponding to the portion to coarse particles 610 having a radius twice the size of a radius of the target particles. The modeling apparatus down-samples the target particles in remaining portions to coarse particles 630 having a radius 2.5 times the size of the radius of the target particles, and coarse particles 650 having a radius 4 times the size of the radius of the target particles.

When a modeling space is a three-dimensional (3D) space, coarse particles having a resolution of ⅛-1/64 of the resolution of the original target particles are generated through the down-sampling process described above.

As described above, the modeling apparatus reduces a number of particles to be calculated by adaptively down-sampling the target particles corresponding to at least a portion in which a violation of constraints occurs.

The modeling apparatus may generate coarse particles in different sizes by adaptively down-sampling the target particles based on an error threshold of a geometric boundary and the constraints to be achieved of the target object.

The modeling apparatus may down-sample target particles corresponding to a portion in which a collision does not occur and a portion not corresponding to the geometric boundary, and calculate a correcting value satisfying the constraints of the target object targeting the coarse particles 610, 630, and 650.

Figure 7:
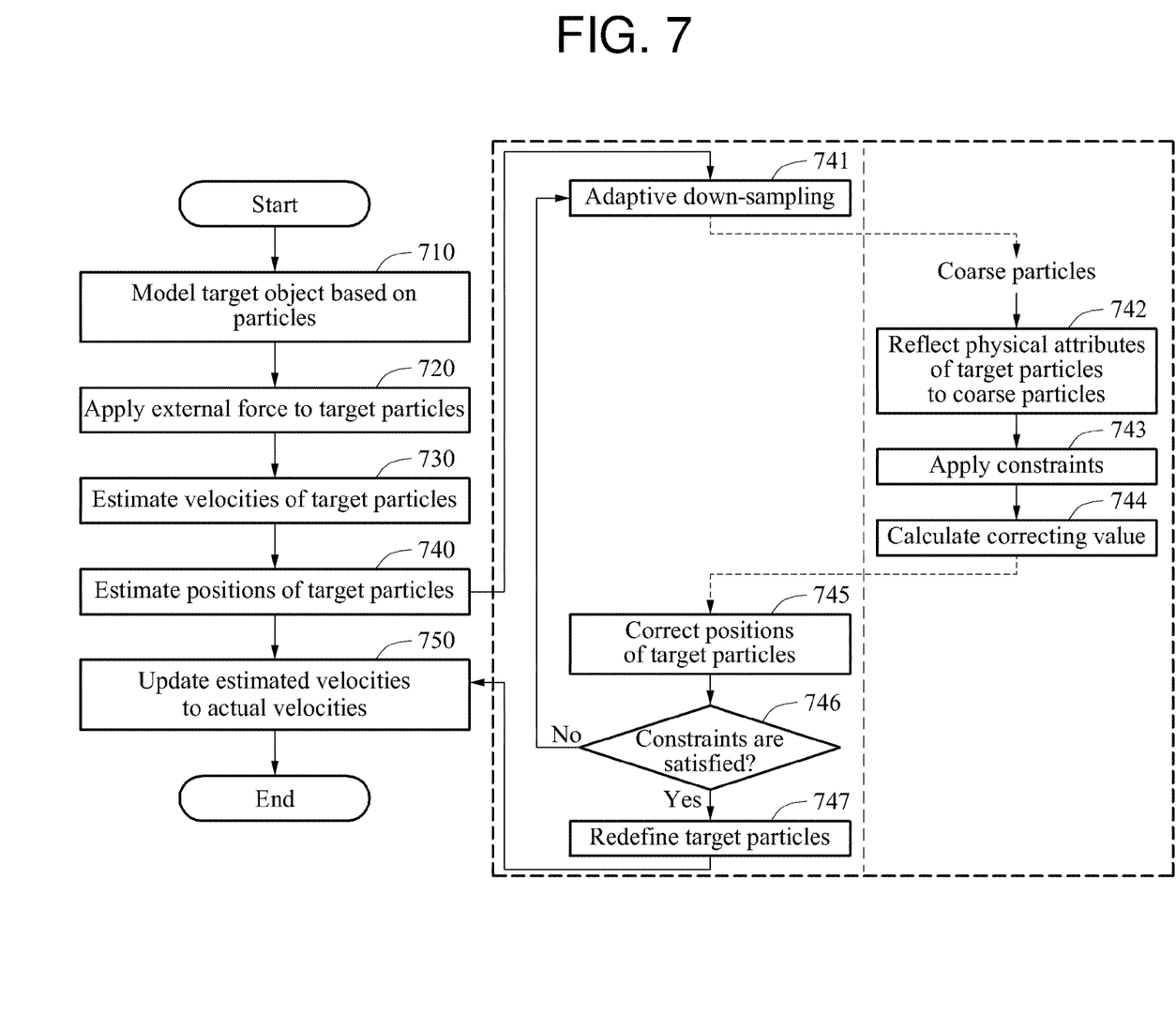
FIG. 7 is a diagram illustrating another example of a process in which a modeling method based on particles is performed.

FIG. 7 is a diagram illustrating another example of a process in which a modeling method based on particles is performed.

Referring to FIG. 7, in operation 710, the modeling apparatus models a target object by target particles based on particles. In operation 720, the modeling apparatus applies an external force to target particles configuring the target object. The external force may be provided in advance, or may be calculated by the modeling apparatus. For example, the modeling apparatus may calculate an external force acting on each particle according to Equation 2 below.

$$u_i = u_i + \Delta t \cdot f_{ext}(x_i) \quad (2)$$

In Equation 2, $u_i$ denotes an external force acting on a particle i, $\Delta t$ denotes a change in time, that is, a time step, and $f_{ext}(x_i)$ denotes an external force affecting the particle i. For example, the modeling apparatus may perform modeling by setting a time step $\Delta t$ to be 0.033 (corresponding to 30 frames per second (FPS)). In this example, in operation 720, the modeling apparatus calculates, for each target particle, an external force due to an interaction between the particle and gravity, and in operation 730, the modeling apparatus estimates velocities for each target particle using the calculated external force.

In operation 740, the modeling apparatus estimates new positions of the target particles satisfying constraints based on the velocities for each target particle estimated in operation 730. In operation 740, the modeling apparatus may estimate the positions for each particle according to Equation 3 below.

$$p\_new = p\_old + \Delta t \cdot v\_new \quad (3)$$

In Equation 3, p_new is an updated position, p_old is a position before the update, Δt is the time step used in Equation 2, and v_new is the velocity estimated in operation 730.

In operation 740, the modeling apparatus estimate new positions of the target particles satisfying the constraints through the processes in operations 741 through 746.

In operation 741, the modeling apparatus selects a portion having a relatively large density error compared to surroundings of a boundary surface of a fluid, and adaptively down-samples the target particles corresponding to the portion to coarse particles in different sizes.

In operation 742, the modeling apparatus reflects physical attributes, for example, masses and densities, of the target particles to the coarse particles. Therefore, the target particles also have the density error of the target particles.

In operation 743, the modeling apparatus applies the constraints to the coarse particles to which the physical attributes of the target particles are reflected. Concisely, the modeling apparatus moves the coarse particles to which the physical attributes are reflected to satisfy the constraints of the target object.

For example, the modeling apparatus moves the coarse particles based on a direction of gravity of a density value so that current densities of the coarse particles reach a target density satisfying the constraints of the target object. Although the foregoing process may enable the densities of the coarse particles to approach the target density, satisfying the constraints at a time may be difficult. In operation 744, the modeling apparatus calculates a length of distance at which the coarse particles were moved in operation 743, for example, a movement value. The movement value may also be referred to as being a correcting value.

In operation 745, the modeling apparatus corrects the positions of the target particles by transferring the calculated movement value to adjacent target particles based on interpolation. In operation 746, the modeling apparatus reflects the movement value and actually moves the target particles, and subsequently determines whether the constraints of the target particles are satisfied by determining changed densities of the target particles at the moved positions. In operation 747, the modeling apparatus redefines the target particles to be the target particles to which the correcting value is applied in response to the target particles to which the correcting value is applied being determined to satisfy the constraints.

In operation 750, the modeling apparatus updates estimated velocities of the target particles to actual velocities based on the redefining of the target particles in operation 747.

Figure 8:
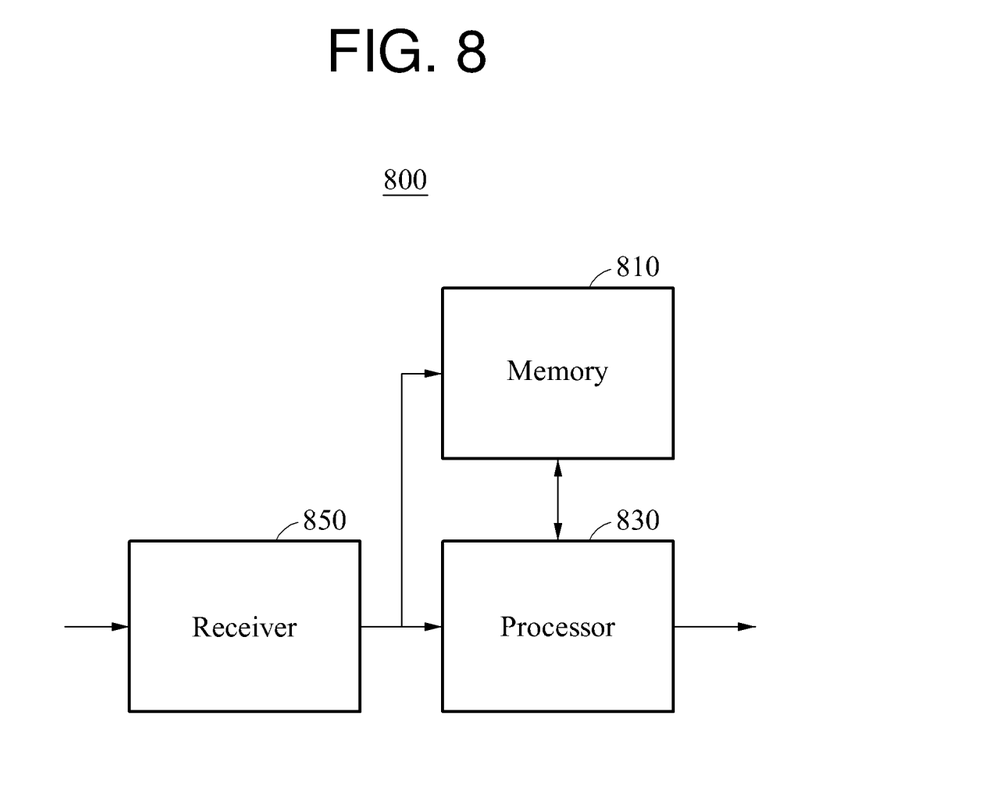
FIG. 8 is a block diagram illustrating an example of a modeling apparatus based on particles.

FIG. 8 is a block diagram illustrating an example of a modeling apparatus based on particles.

Referring to FIG. 8, a modeling apparatus based on particles, hereinafter referred to as a "modeling apparatus 800," includes a memory 810, a processor 830, and a receiver 850.

The memory 810 stores information on target particles. The memory 810 may store physical attributes of the target particles, for example, any one or any combination of any two or more of radiuses, masses, densities, velocities, positions, strengths, and viscosities of the target particles. The target particles are particles configuring a target object when the target object is modeled based on particles. The target particles may be obtained as a result in which a target object is modeled based on particles, or a result of in which a target object is modeled from an outside. Physical attribute values of the target particles may be updated for every time step of the modeling.

The processor 830 generates coarse particles by down-sampling the target particles corresponding to at least a portion of the target object. The processor 830 calculates a correcting value enabling the coarse particles to satisfy constraints of the target object based on the physical attributes of the target particles. The processor 830 redefines the target particles in response to the target particles to which the correcting value is applied being determined to satisfy the constraints.

The processor 830 generates the coarse particles in different sizes by adaptively down-sampling the target particles corresponding to the at least a portion of the target object based on either one or both of a geometric boundary and the constraints of the target object.

The processor 830 sets the at least a portion in which a violation of the constraints occurs in the target object based on an error threshold of the geometric boundary and the constraints of the target object. The processor 830 generates the coarse particles by down-sampling the target particles corresponding to the at least a portion in which the violation of the constraints occurs.

The processor 830 reflects the physical attributes of the target particles to the coarse particles, and calculates a position correcting value enabling the coarse particles to which the physical attributes are reflected to satisfy the constraints.

The processor 830 moves positions of the target particles by applying the position correcting value, and redefines the target particles to be the target particles to which the correcting value is applied in response to the moved target particles being determined to satisfy the constraints. The processor 830 generates the coarse particles based on information on target particles to which the correcting value is applied in response to the target particles to which the correcting value is applied being determined not to satisfy the constraints.

The receiver 850 receives the information on the target particles corresponding to the target object. For example, when the target object is modeled by target particles by the processor 830, the receiver 850 receives information on the target particles corresponding to the target object from the processor 830. When the target object is modeled by the target particles in another apparatus outside the modeling apparatus 800, the receiver 850 receives information on the target particles from the other apparatus.

The modeling apparatus may represent visual contents combined with or equipped in various electronic products including a display, for example, a digital television (TV), a smart phone, and a tablet.

The modeling apparatus 800, the memory 810, the processor 830, and the receiver 850 illustrated in FIG. 8 that perform the operations described herein with respect to FIGS. 1-8 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-8. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-4 and 7 that perform the operations described herein with respect to FIGS. 1-8 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented modeling method based on particles, the method comprising:

analyzing an error for each of target particles and surroundings of boundary surfaces of the target particles corresponding to a target object, based on a geometric boundary and constraints of the target object;

setting at least a portion of the target object in which a violation of the constraints occurs based on the geometric boundary and the constraints of the target object to be a portion in which the coarse particles are to be generated;

generating coarse particles by down-sampling the target particles corresponding to at least a portion of a target object in which the violation of the constraints occurs, based on an error threshold of a geometric boundary and the constraints of the target object;

calculating a correcting value enabling the coarse particles to satisfy the constraints of the target object based on physical attributes of the target particles;

applying the correcting value to the target particles; and redefining the target particles in response to the target particles to which the correcting value is applied satisfying the constraints.

2. The method of claim 1, wherein the generating of the coarse particles further comprises generating the coarse particles in different sizes by adaptively down-sampling the target particles corresponding to the at least a portion of the target object.

3. The method of claim 1, wherein the calculating of the correcting value comprises:

reflecting the physical attributes of the target particles to the coarse particles; and calculating a position correcting value enabling the coarse particles to which the physical attributes are reflected to satisfy the constraints.

4. The method of claim 1, wherein the redefining of the target particles comprises:

applying the correcting value to the target particles;

determining whether the target particles to which the correcting value is applied satisfy the constraints; and redefining the target particles to be the target particles to which the correcting value is applied in response to a result of the determining being that the target particles to which the correcting value is applied satisfy the constraints.

5. The method of claim 4, further comprising re-generating the coarse particles based on information on the target particles to which the correcting value is applied in response to a result of the determining being that the target particles to which the correcting value is applied do not satisfy the constraints.

6. The method of claim 1, wherein the applying of the correcting value to the target particles comprises moving positions of the target particles by applying the correcting value to the target particles.

7. The method of claim 1, further comprising obtaining information on target particles corresponding to the target object.

8. The method of claim 1, wherein the physical attributes of the target particles comprise any one or any combination of any two or more of radiuses, masses, densities, velocities, positions, and strengths of the target particles.

9. The method of claim 1, wherein the target object comprises either one or both of a fluid and a deformable body.

10. A non-transitory computer-readable storage medium storing instructions for causing a processor to perform the method of claim 1.

11. A modeling apparatus based on particles, the apparatus comprising:

a memory configured to store information on target particles; and a processor configured to analyze an error for each of target particles and surroundings of boundary surfaces of the target particles corresponding to a target object, based on a geometric boundary and constraints of the target object, set at least a portion of the target object in which a violation of the constraints occurs based on the geometric boundary and the constraints of the target object to be a portion in which the coarse particles are to be generated, generate coarse particles by down-sampling the target particles corresponding to at least a portion of a target object in which the violation of the constraints occurs, based on an error threshold of a geometric boundary and constraints of the target object, calculate a correcting value enabling the coarse particles to satisfy the constraints of the target object based on physical attributes of the target particles, applying the correcting value to the target particles, and redefining the target particles in response to the target particles to which the correcting value is applied satisfying the constraints.

12. The apparatus of claim 11, wherein the processor is further configured to generate the coarse particles in different sizes by adaptively down-sampling the target particles corresponding to the at least a portion of the target object based on either one or both of the geometric boundary and the constraints of the target object.

13. The apparatus of claim 11, wherein the processor is further configured to reflect the physical attributes of the target particles to the coarse particles, and calculate a position correcting value enabling the coarse particles to which the physical attributes are reflected to satisfy the constraints.

14. The apparatus of claim 11, wherein the processor is further configured to move positions of the target particles by applying the correcting value, and redefine the target particles to be the target particles to which the correcting value is applied in response to the moved target particles satisfying the constraints.

15. The apparatus of claim 11, wherein the processor is further configured to re-generate the coarse particles based on information on the target particles to which the correcting value is applied in response to the target particles to which the correcting value is applied not satisfying the constraints.

16. The apparatus of claim 11, further comprising a receiver configured to receive information on target particles corresponding to the target object.

* * * * *